United States Patent

[11] 3,611,319

[72] Inventor Gilbert P. Hyatt
Los Angeles, Calif.
[21] Appl. No. 804,756
[22] Filed Mar. 6, 1969
[45] Patented Oct. 5, 1971
[73] Assignee Teledyne, Incororated
Los Angeles, Calif.

[54] ELECTRICALLY ALTERABLE READ ONLY MEMORY
9 Claims, 4 Drawing Figs.

[52] U.S. Cl. .......... 340/173 SP, 307/238
[51] Int. Cl. .......... G11c 11/40, G11c 17/00
[50] Field of Search .......... 340/173 SP

[56] References Cited

UNITED STATES PATENTS

| | | | |
|---|---|---|---|
| 3,028,659 | 4/1962 | Chow | 340/173 |
| 3,245,051 | 4/1966 | Robb | 340/173 |

*Primary Examiner*—Terrell W. Fears
*Attorney*—Lindenberg, Freilich & Wasserman

ABSTRACT: A memory system is disclosed in which a nonvolatile, write once, nondestructive readout (NDRO) memory array or matrix is accessed by electrical control circuitry, incorporating electronic switches such as silicon-controlled rectifiers (SCR's). The array includes data-storing cells, typically in the form of diodes, with one cell connected at each junction or nodal point between a word line and a bit line of the array. One binary state is stored in a cell if current can conduct through the cell, while the other binary state is stored if current is permanently inhibited or disrupted from being conducted through the cell. In the write mode, the switches are operated to sequentially select cells, through which a sufficiently high current is supplied until the cell is affected to permanently disrupt the flow of current therethrough. Verification of the storing of any bit is automatically produced. The system further provides a capability of erasing any stored multibit combination, or word, as well as a capability of modifying the content of any word by storing a new word in a spare section of the memory array.

INVENTOR.
GILBERT P. HYATT
BY Lindenberg & Freilich
ATTORNEYS

INVENTOR.
GILBERT P. HYATT
BY Lindenberg & Freilich
ATTORNEYS

INVENTOR.
GILBERT P. HYATT
BY Lindenberg & Freilich
ATTORNEYS

ELECTRICALLY ALTERABLE READ ONLY MEMORY

BACKGROUND OF THE INVENTION

1. Field of the Invention

This invention generally relates to a memory system and, more particularly, to a system which incorporates at least one nonvolatile nondestructive readout (NDRO) memory array or matrix.

2. Description of the Prior Art

Memory systems are often implemented by coupling an input select signal to an output sense line in a memory array. Coupling can be achieved by electromagnetic, electrostatic, electromechanical or conduction means. Coupling is performed by a memory element at the coupling point between the input and output signals, where the state of the memory element will control the degree of coupling and, therefore, the state of the output signal.

In some applications, a need arises for a memory system which is capable of permanently storing data, typically in the form of multibit words, without destroying the data content by repeated readout. Another desired capability of the system is that the data be protected from destruction when power is removed or turned off. This need is partially fulfilled by presently, commercially available memory matrices or arrays in which multibit words can be permanently stored. Each word or number, so stored, may be read out repeatedly, nondestructively. This array is designed so that the data is not destroyed even when power is turned off, i.e., the array is nonvolatile.

A typical nonvolatile, nondestructive readout memory array consists of a plurality of word lines and a plurality of bit lines, with an element that will couple the input select electrical signal to the output sense lines. Thus, each word line is connected to every bit line by a different memory cell. A first binary state is stored at a nodal point if current is free to conduct through the diode, while a second binary state is stored if the diode is permanently disabled from conducting current therethrough. One technique of disabling the flow of current is to somehow affect the connection through a diode.

In such an array, once a multibit word is stored, by affecting the connections of selected ones of the diodes which are coupled to a particular word line and thereby storing ones at selected cells, the word is permanently stored thereat. A new word cannot be written or stored at the same location, since disconnected diodes, in cells representing ones, cannot be reconnected to represent binary zeros. Thus, the array, in addition to being nonvolatile and of the NDRO type, can also be thought of as a write one (WO) array, since once a number or word is stored at any particular word location, a new word cannot be stored or rewritten at the same location at a later time. Hereafter, such an array will be referred to by the acronym WONDRO.

At present, all such arrays which are commercially available are in the form of customized items. That is, the manufacturer, after constructing the array, stores in it customer-designated words, so that when the customer receives the array all the designated words are prestored therein. Any required changes in the stored words or a requirement for storing new words which may arise in a system's operation, in which the array is incorporated, cannot be fulfilled. These require the acquisition of a new array with newly designated words.

Such a limitation is most undesirable, since it prevents the use of the array in applications where the words to be stored are determined during a system's operation. Furthermore, the lack of ability to affect the stored words in any way is undesirable in situations in which any of the words, permanently prestored by a manufacturer, is later on found to be incorrect or no longer necessary, and it is desired to erase or eradicate such a word from the memory. A need, therefore, exists for a memory system capable of easily accessing a WONDRO array to write or store therein, repeatedly read any of the stored words without affecting them, as well as be capable of modifying the content of any word under special circumstances.

Furthermore, since at present some WONDRO arrays are available as integrated circuits, it is most desirable that any memory system incorporating such an array include circuitry composed mainly of elements which lend themselves to integrated circuitry fabrication techniques. This would enable the construction of a complete WONDRO memory system as an integrated circuit, an advantage clearly appreciated by those familiar with the advantageous properties of integrated circuits. Briefly, these include small size, light weight and often lower cost than realizable by systems or devices, designed and fabricated with discrete components.

OBJECTS AND SUMMARY OF THE INVENTION

It is a primary object of the present invention to provide a new memory system, incorporating a write once nondestructive readout memory array.

Another object of this invention is the provision of a memory system for storing and modifying a plurality of multibit words in a nonvolatile, nondestructive readout-type array, in which the words are permanently stored.

A further object of the invention is to provide a memory system which lends itself to integrated circuit fabrication techniques.

Still a further object of the invention is the provision of novel, highly reliable circuitry for accessing a write nondestructive readout-type memory array, to read or control the content thereof.

These and other objects of the invention are achieved by providing a unique memory access control circuit which is coupled to the word and bit lines of a WONDRO-type memory array, in which all of the data cells, typically in the form of diodes, are coupled to their respective lines, so that each is capable of storing either a binary zero (0) or a binary one (1) as a function of the current conduction characteristics thereacross. A cell is assumed to store a first binary state when current is free to conduct through the cell thereof, while a second binary state is stored when current is permanently prevented from conducting through the cell.

The memory access control circuit includes elements with which a preselected potential difference can be applied across a selected one of the cells, all of which are initially in the first binary state. The potential difference which causes write current to flow or conduct through the selected cell is selected to be high enough so that, after current conduction occurs, the cell is somehow affected to permanently disrupt the current flow therethrough and thereby switch the cell to its second binary state. The write current may affect the cell by breaking the connection between one of the cell's terminals and thereby inhibit permanently the current flow between the bit and word lines across which the cell has been previously connected.

In the present invention, a simple arrangement is provided to automatically verify the bit value stored at each cell. Furthermore, a simple arrangement is provided to read any of the stored words without affecting its content, namely, the plurality of bits comprising the stored word. In other embodiments of the present invention, the system further includes control circuitry with which any of the permanently stored words may be permanently erased if its bit content is no longer required or correct. In one embodiment of the invention, a capability, analogous to rewriting stored words, is provided, even though at each specific memory array location, once a word is stored therein, a new word cannot be stored at a later date. The system as a unit can be thought of as one providing the the capability of modifying the content of stored words. This feature will be discussed and described hereafter in sufficient detail.

All the control circuits, included in the present invention, incorporate elements or components which lend themselves to integrated circuit fabrication techniques. Consequently, substantially the entire system of the present invention may be fabricated as an integrated circuit, to result in a small, lightweight and reasonably inexpensive unit. The small size and weight of such a system are particularly significant when the system has to be incorporated in space exploration equipment, where weight and size are of primary concern.

The novel features of the invention are set forth with particularity in the appended claims. The invention will best be understood from the following description when read in conjunction with the accompanying drawings.

BRIEF DESCRIPTION OF THE DRAWINGS

FIG. 4 is a block diagram of yet another embodiment of the invention.

DESCRIPTION OF THE PREFERRED EMBODIMENTS

Figure 1:
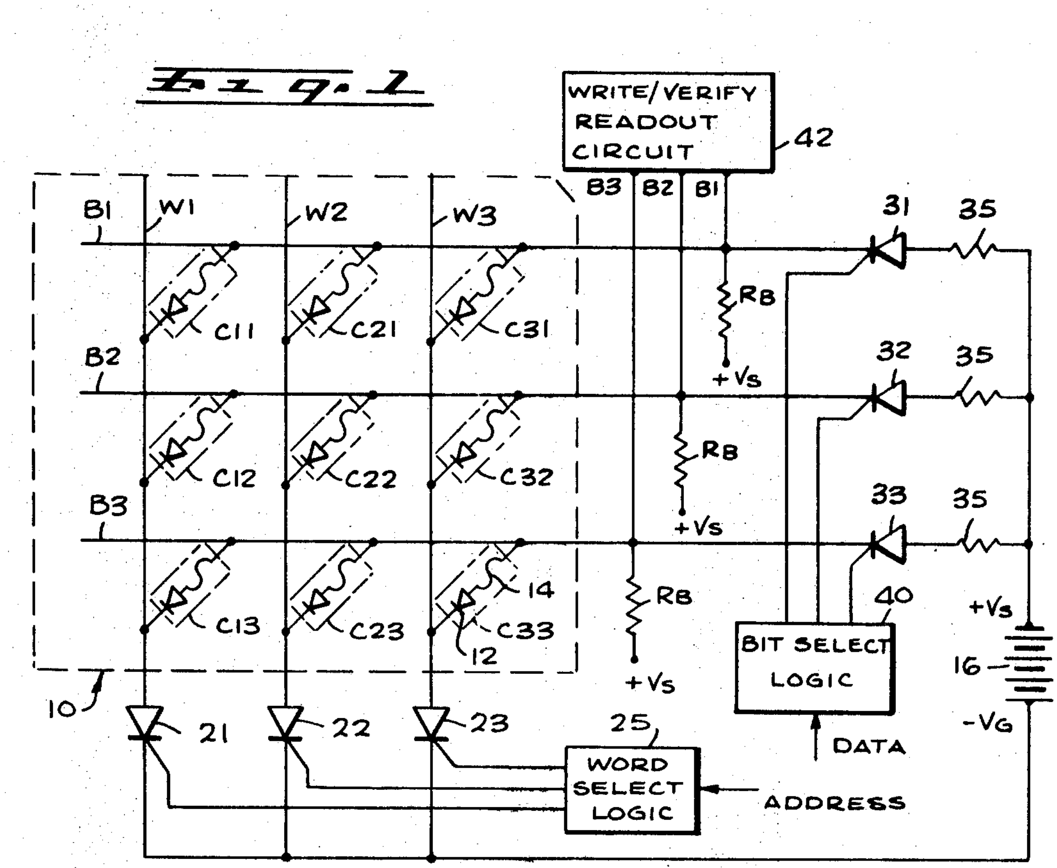
FIG. 1 is a block diagram of the Write circuitry of the memory of the present invention.

Reference is now made to FIG. 1 which is a simplified block and schematic diagram of an exemplary embodiment of the present invention, shown connected to a nonvolatile, write once, nondestructive readout (WONDRO) type memory array or matrix, designated by numeral 10. For explanatory purposes only, the matrix, shown in FIG. 1, is limited to the storing of three three-bit words. However, it should be appreciated, that the teachings are applicable for use in conjunction with an array of any desired data storage capacity, i.e., of any selected number of words, each of any predetermined number of bits.

As shown, the array 10, consists of three word lines, designated W1, W2 and W3, and three bit lines, designated B1, B2 and B3. Each word line is initially connected to every one of the bit lines by a data storing cell, generally designated by the letter C followed by numbers, designating the particular word and bit lines between which the cell is connected. Thus, for example, cell C11 is connected between word W1 and bit line B1, while cell C33 is connected between word line W3 and bit line B3. Each cell is shown comprised of a current-conducting element, typically a diode 12, connected in series with a fuse element 14.

As will be pointed out later, the fuse element 14 need not be a separate component but rather, may consist of the current-conducting link between the cell and the bit line. By supplying a sufficiently high current to any of the cells, this conducting link is affected to permanently disrupt the flow of current therethrough, and thereby inhibit subsequent flow of current through the cell which results in switching its second binary state.

Each of the word lines is connected to the negative terminal, designated $-V_G$ and which will be regarded to be at ground, of a source of potential such as a battery 16 through a word current-control gate, represented in FIG. 1 by a silicon controlled rectifier (SCR), each having anode, cathode and gate terminals. In FIG. 1, the SCR's, associated with word lines W1, W2 and W3, are designated by numerals 21, 22 and 23, respectively. The anode of each SCR is connected to its associated word line, its cathode to the battery terminal, and its gate to the word select logic 25.

Similarly, each of the bit lines is connected to the positive terminal of battery 16 at a level $+V_S$, through a bit current-control gating circuit, shown in FIG. 1 comprised of an SCR. The SCR's which are associated with bit lines B1, B2 and B3 are designated by numerals 31, 32 and 33, respectively. The cathode of each SCR is connected to its associated bit line and its anode is connected to the battery 16 through a current-limiting resistor 35. The gate of each SCR, associated with a bit line, is connected to a bit select logic 40. Hereafter, the SCR's associated with word lines may also be referred to as the word SCR's, while those associated with the bit lines may be referred to as bit SCR's. In addition, each bit line is connected to the positive ($+V_S$) terminal of battery 16 through a bias resistor $R_B$ and to a write/verify/readout circuit 42.

Writing or storing a multibit word in the array 10 is achieved by supplying an address signal to logic 25 to define the word line or location in the array where the word is to be stored. Data is supplied to logic 40 to define the desired state of each of the cells coupled to the selected word line. Assuming that the binary word 101 is to be stored in the location defined by W1, an address defining W1 is supplied to logic 25, which in turn supplies an enabling signal to the gate of word SCR 21. Since prior to the supply of this signal, the various bias resistors $R_B$ were connected with SCR 21 across battery 16, a sufficient anode to cathode potential is present across SCR 21, so that when the enabling signal is supplied to its gate, it is switched to an ON state to enable current to conduct therethrough, with a minimum potential drop or resistance thereacross. Thus, the cathodes of the diodes of the three cells coupled to word line W1 are clamped to ground ($-V_G$). Alternately stated, the potential at word line W1, when SCR 21 is enabled or ON, is substantially $-V_G$ or ground. From this example, the first binary state, where current is not disrupted from flowing through the cell, shall be considered a binary "one" and the second binary state, where current is disrupted from flowing through the cell, shall be considered a binary "-zero." Alternate mechanization can implement the first binary state as a "zero" and the second binary state as a "one."

Assuming that the potential drop across each of the cells is negligible, each of the bit lines is at ground potential, and therefore a positive potential difference is present across the anode to cathode junction of each of the bit line SCR's. To store a multibit number such as 101 at the location defined by W1, logic 40 supplies an enabling signal to the gate of bit SCR 31, switching it to ON. When this occurs, current conducts through the load resistor 35 which is connected to SCR 31, bit line B1, cell C11, word line W1, and the word SCR 21 to the negative terminal of battery 16.

The potential of battery 16 and the resistive value of resistor 35 are chosen so that the conducting current is sufficiently high to affect or blow the fuse element 14 of cell C11, and thereby permanently disrupt the current flow through diode 12 of the cell. This, in essence, switches cell C11 to its one state in which the bit line B1 is permanently electrically disconnected from word line W1. As a result of the electrical decoupling of bit line B1 from word line W1, the potential difference which was present across SCR 31 is removed, automatically causing the bit SCR to switch to OFF. The current will be conducted for a precise period of time which is required to write the second binary state, which may not be the same for all cells. Therefore, this provides an adoptive feature, where current will be conducted only for the required period and will automatically switch off the bit SCR at the exact completion of the write operation, without the requirement for external control. Thus, it is seen that by switching any of the cells to its one (1) state, the bit SCR associated with its bit line, is automatically switched OFF. Such a feature eliminates the need to separately disable such a gate before proceeding to store a bit in another cell.

It should be pointed out that the storing of any bit in a cell is automatically verified by readout unit 42 which is connected to each bit line. In the present example, after bit SCR 31 is switched to OFF, the bit line W1 is disconnected from the ground voltage $-V_G$. The bias resistor $R_B$ will bias the bit line B1 to the voltage $+V_s$. Therefore, the bit lines will be at ground voltage $-V_G$ if the cell does not disrupt the current flow, but will be at voltage $+V_s$ if the cell does disrupt the current flow for the select word line. Thus, by noting that bit line B1 is at $+V_s$ potential (when W1 is at ground) it indicates that a 1 is stored at the nodal point defined by B1 and W1. It should be pointed out that at this point of the write operation, the potential at each of bit lines B2 and B3 is ground ($-V_G$). These potential levels will be reflected in the readout unit 42 to indicate that the cells coupling these bit lines to W1 store zeros.

After storing the 1 in cell C11, the write operation sequentially advances to store the proper bit in cell C12. However, since a 0 has to be stored therein, an enabling signal is not supplied to the gate of bit SCR 32, thereby preventing the write current flow through cell C12. Subsequently, an enabling signal is supplied to the gate of bit SCR 33 in order to permanently disrupt the flow of current through cell C13. Thus, the word or number 101 is stored at the location, defined by word line W1. To store a succeeding multibit word, word SCR 21 is first switched to OFF by logic 25, and another of the word SCR's is selected. Which word SCR is selected depends on the location (word line), chosen for storing the succeeding word.

In FIG. 1, the word select logic 25 and the bit select logic 40 are shown in block form, since such circuits are extensively used in accessing memories and therefore they are known by those familiar with the computer art. It should be pointed out that the memory-accessing circuitry, shown in FIG. 1 includes logic elements, all of which are of the type which lend themselves to integrated circuit fabrication techniques.

Figure 2:
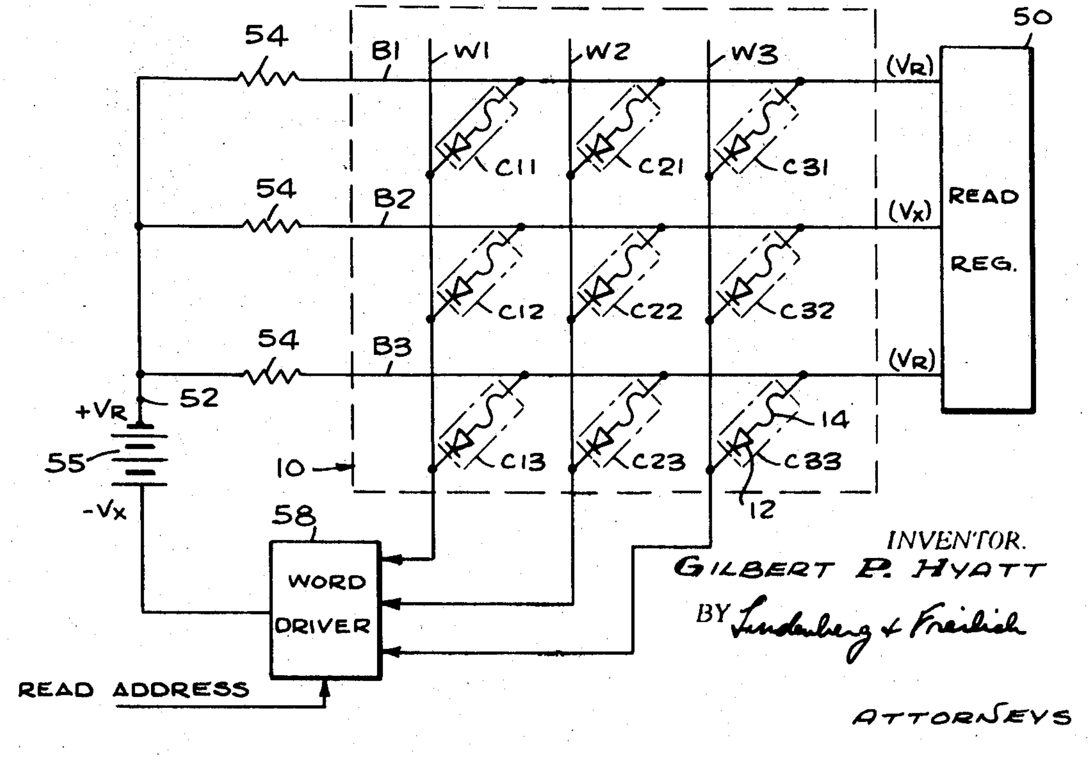
FIG. 2 is a block diagram of the Read circuitry of the memory of the present invention.

Reference is now made to FIG. 2, which is a simplified diagram of control circuitry required to read or interrogate a selected one of the words in matrix 10. Briefly, each of the bit lines is connected to a read register 50 as well as to a terminal 52, through a separate load resistor 54. Terminal 52 is shown connected to the positive terminal of a battery 55 which is assumed to be a potential $V_R$, while the negative terminal of battery 52 is shown at a potential $V_X$. Each word line is connected to a word driver 58, which selectively connects one of the word lines to the negative terminal of battery 55, depending on a READ ADDRESS, which defines the word to be read out. When a word, such as W1, is selected, any bit line coupled to W1 by a cell in the first binary state that will conduct current is at potential $V_X$ since the cell clamps the bit line to the word line potential. On the other hand, a bit line coupled to a cell in the second binary state that will not conduct current, is not clamped to potential $V_X$. Consequently, the potential at a bit line associated with a cell in the first binary state is substantially the positive potential level $V_R$. Thus, potential level supplied to the read register from each one of the bit lines indicates the binary value of a bit of the word, stored at the selected word location.

In the foregoing example, in which it is assumed that the word W1 is 101, during readout, the potential level at bit line B2 would be $V_x$, while the potential level at bit lines B1 and B3 would be $V_R$. These potential levels which are read out from word W1 are indicated in parentheses adjacent to the various bit lines connected to the read register 50. With the circuitry shown in FIG. 2, all the bits of a selected word are read out in parallel. The entire content of the memory could be read out by sequentially reading out each of the words stored therein.

From the foregoing description, it should be appreciated that, in accordance with the teachings of the present invention, a relatively simple memory access control circuit arrangement is provided, by means of which binary digits or bits can be stored in a WONDRO-type matrix, as well as can be conveniently read out therefrom. As previously indicated, when using such a matrix it may be necessary or desirable to be able to erase or eradicate any multibit word stored in the matrix, without affecting any of the other words therein. This need may occur because a certain word is no longer necessary or its content is found to be incorrect. Since initially all the cells are in the first binary state, one technique of erasing a word would be to drive all the cells associated with its location or word line to their second binary state. For example, the word W1, previously assumed to consist of a 101 bit combination could be erased by merely driving cell C12 (FIG. 1) to its 1 state, so that when word W1 is read out all its bits are 1's.

Such a word erase technique would not be too time consuming if the number of bits per word is not too great. If, however, the system incorporates a matrix with a large number of bits per word, such a technique may not always be feasible, and a different erase technique may have to be implemented. In accordance with the teachings of the present invention, an erase control circuit may be incorporated in the memory system disclosed herein so that, when desired, any permanently stored word may be eradicated from the memory without the need to store a binary one in each one of its cells.

Figure 3:
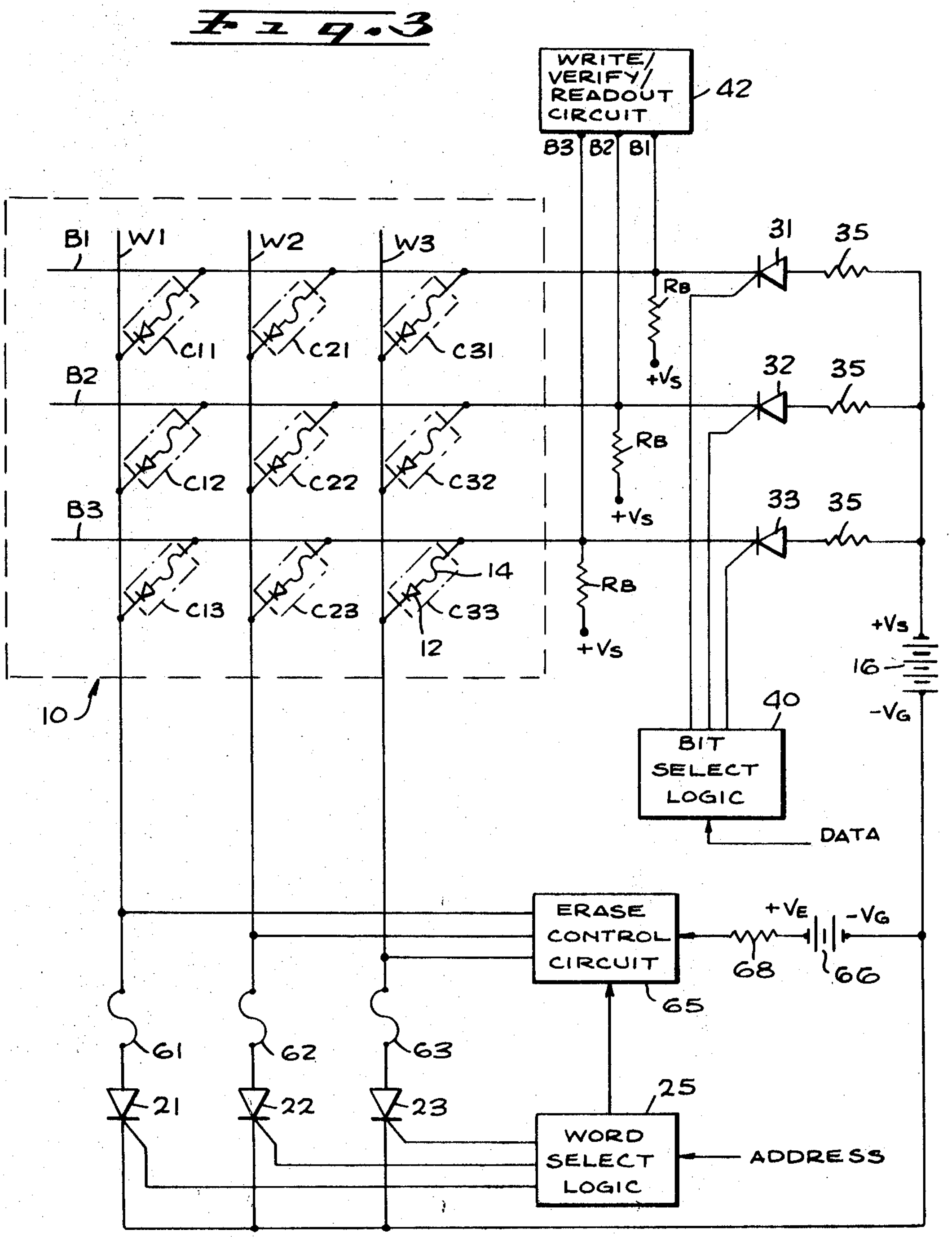
FIG. 3 is a block diagram of another embodiment of the present invention.
Figure 2:
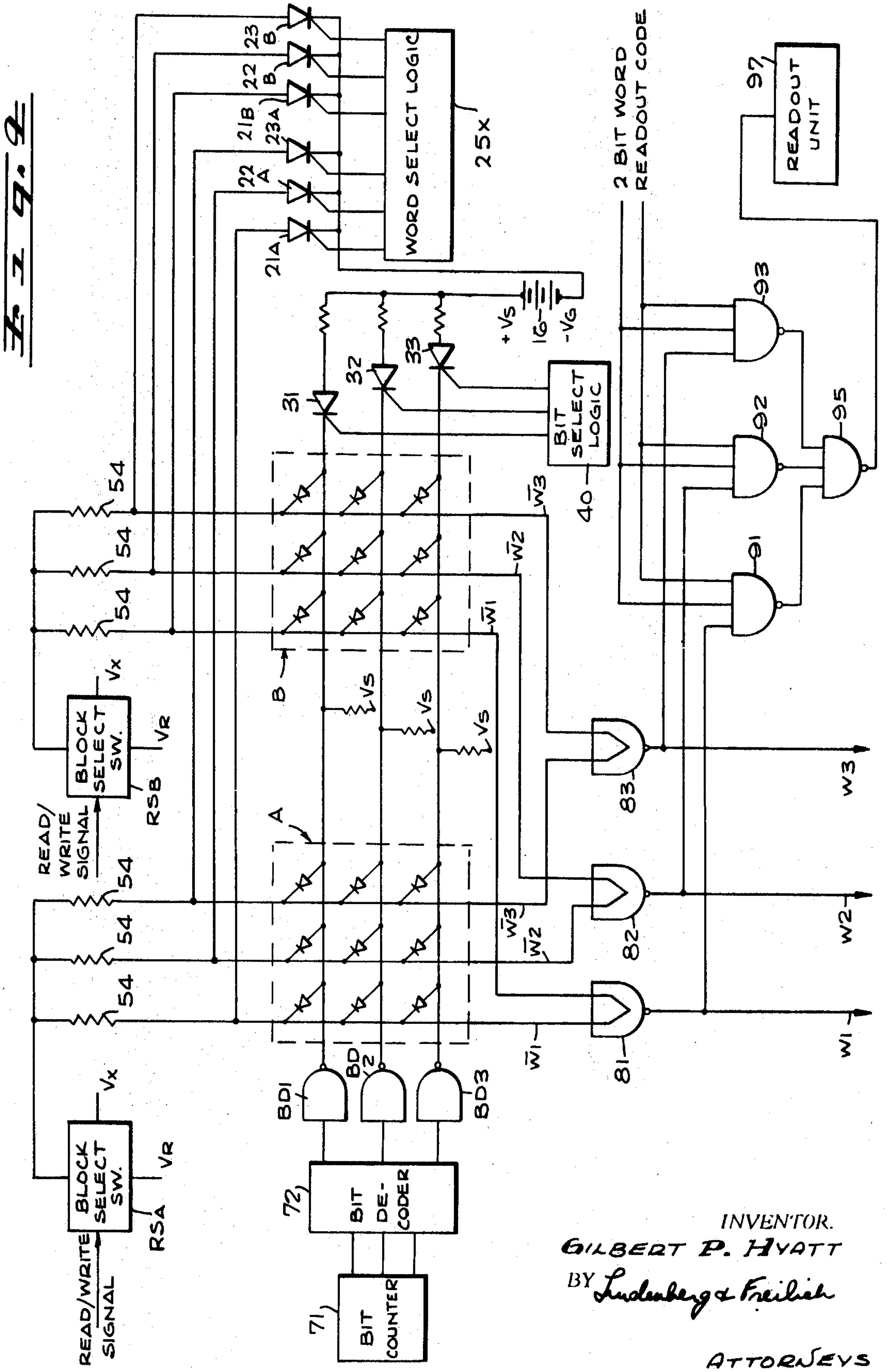

To explain how such circuitry would operate, reference is made to FIG. 3, which is similar to the arrangement shown in FIG. 1 and in which elements like those shown in FIG. 1 are designated by like numerals. In order to provide word erasure capability without the need to store a 1 in each of the word's cells, in the embodiment of the invention shown in FIG. 3, the word SCR's 21, 22 and 23 are not connected directly to the word lines as shown in FIG. 1, but rather through respective fuse elements 61, 62 and 63. The junction point of each of these fuse elements with its respective word line is connected to an erase control circuit 65 which is connected to the positive terminal at a potential $V_E$ of a battery 66, through a resistor 68. The other terminal of battery 66 is assumed to be at ground potential ($V_G$). Each of the fuse elements 61, 62 and 63, which hereafter may be referred to as the word fuse, is chosen so that it can conduct the maximum current used to blow any of the fuse elements in any of the cells in order to store a 1 therein without being adversely affected thereby. That is, the current-carrying capacity of fuse element 61 is considerably greater than the current carrying capacity of any of the fuse elements 14 in the various cells, so that a current which is sufficiently high to blow a fuse element in a cell may conduct through the word fuse, without the latter being affected thereby.

In the write mode of operation, the embodiment shown in FIG. 3 is operated in a manner identical with that described in conjunction with FIG. 1. If, however, during the write operation an erroneous word is written in, or a word has to be erased during the system's operation, the word to be erased is selected by the word select logic 25 to enable the word's SCR. Thereafter, the erase control circuit 65 is energized to connect the selected word line to resistor 68, so that the latter, the word fuse element and the word SCR, associated with the particular word line, are connected in series across battery 66.

The potential difference across the battery and the resistive value of resistor 68 are selected so that a very large current is caused to flow through the word fuse. The current is high enough to blow the word fuse, and thereby permanently disconnect the word SCR from its associated word line. This is analogous to blowing all the fuses in cells associated with the word line. Thus, by blowing the word fuse, associated with any word line, the word stored thereat can be thought of as erased.

For example, word W1 can be erased by first selecting the word by means of logic 25 to switch word SCR 21 to ON, and thereafter, by means of erase control circuit 65, connect the junction point between the fuse element 61 and word line W1 to resistor 68. This would result in a sufficiently high current flow through fuse element 61 to eventually blow it and thereby permanently separate SCR 21 from word line W1. The erase control circuit 65 is basically a switch which, in the erase mode of operation, connects the resistor 68 to one of the word fuses. The switching technique employed in the implementation of circuit 65 is similar to that described for the bit line SCR switches.

Summarizing the foregoing described embodiments of the present invention, they include write control circuitry (FIG. 1) for storing a multibit word or number in any selected location, defined by a word line, in a WONDRO-type matrix, read control circuitry (FIG. 2) for reading out, in parallel, all the bits of any stored word, and specific erase control circuitry (FIG. 3) for erasing any stored word by permanently separating its word line, from its associated word SCR. As previously indicated, erasing a word may also be accomplished by merely driving all its bits to the second binary state by blowing the fuse elements in all its data-storing cells. Thus, the arrangement shown in FIG. 3 provides an alternate erase capability.

As is appreciated by those familiar with the computer art, in addition to the aforementioned capabilities of the memory system of the present invention, situations often arise in which it is desired to modify or rewrite a word in a given memory location. However, as previously indicated, this could not be accomplished in a WONDRO-type memory, in which once a word is written at a given location, a new, different word cannot be rewritten therein. Such a rewrite capability, however, is provided by the embodiment of the present invention shown in FIG. 4 to which reference is made herein.

Briefly, a word rewrite capability is provided by incorporating, in the memory system, a plurality of memory matrices or blocks, two of which are shown in FIG. 4 and are designated by the letters A and B. At any given time, data is only stored in one of the blocks, such as A. To rewrite a word stored therein, such as the word W1, block A is operated in a read mode, and block B in a write mode. All of the words stored in block A, except for the word to be rewritten, (W1) are restored in respective locations in block B. Thereafter, a new or rewritten word W1 is stored in block B, so that at the end of the operation the content of block B is similar to that previously stored in block A, except for a rewritten word W1.

It should be pointed out that rewriting is not performed in the W1 word location in block A. Rather rewriting is achieved by restoring all the unmodified data from block A in block B with a modified or rewritten word. It should be apparent that by incorporating additional blocks rewriting may be accomplished more than once. Thus, if any of the words stored in block B has to be modified, rewriting would be accomplished by merely transferring the block's unmodified content and new modified words to a succeeding block, and so on.

Attention is again directed to FIG. 4, wherein elements, like those previously described, are designated by like numerals. In FIG. 4, the circuitry for reading the data stored in any of the matrices is shown comprising block select switches $RS_A$ and $RS_B$, a bit counter 71 connected to a bit decoder 72 which is connected to each one of the bit lines through a separate bit driver. The latter are designated, BD1, BD2 and BD3. The read circuitry also includes a plurality of logic gates of the NAND type, designated by numerals 81, 82 and 83 and 91 through 95. Gates 81, 82 and 83 are connected so as to perform an OR function. With this particular arrangement, the memory can be read in a serial fashion, bit by bit, where the corresponding bits of all words are available at the memory output gates 81 through 83, simultaneously. The outputs of gates 81 through 83 are supplied to gates 91 through 93, respectively, whose outputs are in turn combined in gate 95. At any given time, only one of gates 91 through 93 is enabled by signals from the word select logic 25*x*, so the output of gate 95 corresponds to the output of one of the gates 81 through 83 for readout purposes.

Briefly, the word lines in each block are connected through respective read resistors 54 to the block select switch associated with the particular block. Also, corresponding word lines in the various blocks are connected to the same output gate. For example, word lines W1 in blocks A and B are connected to gate 81, lines W2 to gate 82 and lines W3 to gate 83. A block is selected for reading by controlling its block select switch $RS_A$ to connect the block's word lines to the negative terminal or level of a read power supply such as $V_r$ of battery 55 (see FIG. 2).

The bit drivers (BD1, BD2, etc.) are operated to provide in sequence, the positive potential of the read power supply, such as $V_R$ of battery 55 to the bit lines. A cell or diode in the conducting binary state clamps the word line to $V_r$ so that the NAND gate to which it is connected provides an output of a level representing a binary 0. On the other hand, an open cell in the 1 state does not clamp the word line to $V_r$. Rather, the word line is at the $V_R$ potential of the activated bit driver, in which case the gate output represents a binary 1.

In the arrangement shown in FIG. 4, in the read mode, the outputs of gates 81, 82 and 83 are streams of bits, representing the words W1, W2 and W3 respectively stored in the block, which is read out. Corresponding bits of the various words are read out in parallel. It should be pointed out that even though all the corresponding word lines (such as W1) in the various blocks are connected to the same gate (such as 81), since, at any time, only one block is read out, the output of the particular gate represents the bits stored at the corresponding word line in the block selected for readout. By connecting the outputs of gates 81, 82 and 83 to gates 91, 92 and 93, respectively, and by combining the outputs of the latter in gate 95, readout may be limited to one word by enabling one of the gates 91, 92 and 93. For example, when gate 91 is enabled, the output of gate 95, which is supplied to a readout unit 97, is identical with the output of gate 81. With a three gate readout arrangement, required for a three word block capacity, two enabling lines are required to provide a two-bit code which represents the word selected for read out. The two-bit code on these lines is assumed to be supplied from an external source which does not form part of this invention.

The arrangement in FIG. 4 includes the circuitry required to write or store words in any of the blocks. The write control circuitry is very similar to that shown in FIG. 1, except that in the FIG. 4 arrangement the word lines of each block, such as W1, W2 and W3 of block A, are connected to a separate group of SCR's such as 21A, 22A and 23A, whose cathodes are tied together and connected to the negative terminals such as $V_G$ of a battery 16. The control gates of all these SCR's are connected to a word logic 25*x* which in response to a signal or signals from an external source selects which SCR is to be enabled in order to supply the voltage $V_G$ to one of the word lines in the selected block, such as B, in which data is to be entered.

It should be stressed that since read and write currents are supplied from two separate power supplies, data may be read out from one block at the same time that data is written into another. This is particularly advantageous for word modification purposes, since each word does not require modification can be stored in a selected, previously unused, block as it is read out from a previously used block without requiring additional write time.

The ability of the circuitry shown in FIG. 4 to modify a stored word by data transfer from one block to another may best be summarized with a specific example. Let it be assumed that of the three words stored in block A, word W3 has to be modified. This could be accomplished by the proper switching of switch $RS_A$ so that block A is in a read mode, in which potential $V_r$ is supplied to the word lines in block A. Gate 91 is enabled by the two-bit code so that, as the matrices are driven by the bit drivers, each bit of the word W1 in block A, is read out in sequence and is present in unit 97. Since word W1 is not the one to be rewritten, word select logic 25*x* enables SCR 21B and bit logic 40 is sequentially enabled so as to store the word W1 in block A in the cells of W1 in block B. After word W1 is stored in block B without any modifications, the operation is repeated for word W2. After the first two read-write cycles, the operation is terminated and a new or modified W3 is stored in block B activating SCR 23B by a control signal from 25*x* and by supplying the bit select logic 40 with a stream of bits, representing the new W3 word, from an appropriate source of data.

After the new W3 word is stored in block B, the content of the latter is similar to the content of block A except for a different, updated W3 word, which can be thought of as a modified word. It should again be pointed out that the modification or word W3 is not performed by changing the content of W1 in block A. Rather it is achieved by transferring the content of block A to block B, except for a new or modified word W3, which is then stored therein. Thereafter, the data in block B is used in a manner identical with the previous use which was made of the data in block A.

It is realized that to provide a word modification capability, such as herebefore described, it is necessary to incorporate more than one memory block or matrix. However, since such matrices are at present manufacturable as integrated circuits, this requirement should not be regarded as too significant either from a size or cost point of view. Furthermore, it should be pointed out that practically all the circuitry shown in FIG. 4 for controlling the operation of the plurality of blocks could be fabricated by integrated circuit techniques to result in a relatively small memory system, with a word modification capability even though write once type matrices are incorporated therein.

The novel features of the invention are set forth with particularity in the appended claims. The invention will best be understood from the following description when read in conjunction with the accompanying drawings.

What is claimed is:

1. In combination with at least one memory array of the type including *x* word lines, and *n* bit lines and *xn* data storing cells, with a separate cell connected between each word line and one of said bit lines, each cell being in either a first state in which it defines a data bit of a first binary value when current can conduct through the cell between the word and bit lines to which it is connected, or in a second state which defines a data bit of a second binary value when the flow of current through the cell is permanently disrupted, an arrangement comprising:

first and second terminals connectable to first and second potential levels respectively;

*x* word current gates, each connected between said first terminal and a different word line with which it is associated;

*n* bit current gate means each including a silicon controlled rectifier (SCR) switchable between ON and OFF states and having anode, cathode and gate terminals with the anode and cathode connected between said second terminal and a different bit line with which it is associated;

word select means coupled to said *x* word current gates to select any of said word lines by enabling its associated gate so that the selected word line is substantially at said first potential level; and bit select means coupled to the gate terminals of the SCR's of said *r* bit current gate means for switching a selected SCR from an OFF to an ON state by the application of a signal to said gate terminal, the potential difference between said first and second levels being sufficient to induce the conduction of current of a preselected minimum amplitude between the selected word and bit lines through the cell coupled therebetween, said current affecting said cell to permanently disrupt the flow of current therethrough with the disruption of current flow automatically switching the selected SCR to its OFF state.

2. The arrangement as recited in claim 1 further including third and fourth terminals connected to third and fourth potential levels, *n* read resistors, each having one end connected to said third terminal and another end connected to one of said bit lines, a word driver for connecting a selected one of said word lines to said fourth terminals and readout means coupled to said *n* bit lines for sensing the states of the *n* cells coupled to the selected word line.

3. The arrangement as recited in claim 1 wherein the gate terminal of each SCR is connected to said bit select means, the potential difference between said first and second potential levels being great enough to produce a sufficient anode to cathode potential drop across said SCR when any of said word lines is substantially at said first potential level, whereby an enabling signal from said bit select means to the gate terminal of an SCR enables the SCR to switch it to its ON state, to enable current to flow through the cell connecting its associated bit line to the selected word line, the disruption of current flow through said cell which is switched to its second state, substantially isolating the SCR from the selected word line, reducing the anode to cathode current therethrough and thereby automatically switching the SCR to its OFF state.

4. The arrangement as recited in claim 3 wherein each of said *x* word current gates is an SCR having anode, cathode and gate terminals, with its anode and cathode terminals connected between said first terminal and associated word line, and the gate terminal is connected to said word select means, said arrangement further including bias means coupled to said word lines through said cells to produce a sufficient anode to cathode potential difference across each word SCR, to enable one of the word SCR's to switch to its ON state when an enabling signal is applied through said word select means to its gate terminal.

5. The arrangement as recited in claim 4 wherein said bias means include *n* bias resistors, each having one end connected to said second potential level and the other end to a different bit line.

6. The arrangement as recited in claim 5 further including write verify means connected to each of said bit lines to provide an indication of the states of the cells connected to said enabled word line as a function of the potential levels at said bit lines.

7. The arrangement as recited in claim 6 further including third and fourth terminals connected to third and fourth potential levels, *n* read resistors, each having one end connected to said third terminal and another end connected to one of said bit lines, a word driver for connecting a selected one of said word lines to said fourth terminals and read out means coupled to said *n* bit lines for sensing the states of the *n* cells coupled to the selected word line.

8. The combination as recited in claim 1 including a plurality of substantially identical memory arrays, array-write control means for selecting the array into which a *n*-bit word is to be stored by controlling the states of a selected group of *n* cells connected to a selected word line in said selected array, and array-read control means for selecting the array from which the states of all cells coupled to a selected bit line are read out in parallel, with the states of the cells coupled to different bit lines being read out in series.

9. The combination as recited in claim 8 further including *x* readout gates, each connected to corresponding word lines in said arrays to provide an output corresponding to the states of a cell connected to its associated word line and the selected bit line in the array selected for readout.